United States Patent
Lang et al.

(10) Patent No.: US 8,591,297 B2
(45) Date of Patent: *Nov. 26, 2013

(54) SYSTEM AND METHOD FOR TREATING LIVE CARGO SUCH AS POULTRY WITH GAS

(75) Inventors: Gary Dee Lang, Naperville, IL (US); Narsimha R. Nayini, Burr Ridge, IL (US)

(73) Assignee: Praxair Technology, Inc., Danbury, CT (US)

( * ) Notice: Subject to any disclaimer, the term of this patent is extended or adjusted under 35 U.S.C. 154(b) by 242 days.

This patent is subject to a terminal disclaimer.

(21) Appl. No.: 12/775,741

(22) Filed: May 7, 2010

(65) Prior Publication Data

US 2010/0216380 A1   Aug. 26, 2010

Related U.S. Application Data

(63) Continuation of application No. 11/508,703, filed on Aug. 23, 2006, which is a continuation-in-part of application No. 11/230,547, filed on Sep. 21, 2005, now Pat. No. 7,794,310, which is a continuation-in-part of application No. 11/176,277, filed on Jul. 8, 2005, now abandoned.

(51) Int. Cl.
    *A22B 3/00*     (2006.01)
    *A22C 21/00*    (2006.01)

(52) U.S. Cl.
    USPC ............................................ 452/66; 452/57

(58) Field of Classification Search
    USPC .............................................. 452/57–61, 66
    See application file for complete search history.

(56) References Cited

U.S. PATENT DOCUMENTS

| | | | |
|---|---|---|---|
| 2,526,037 A | 10/1950 | Murphy | |
| 2,737,683 A | 3/1956 | Regensburger | |
| 3,487,497 A * | 1/1970 | Jorgensen et al. | 452/53 |
| 3,548,447 A | 12/1970 | Price, Jr. | |
| 3,828,396 A * | 8/1974 | Wernberg | 452/66 |
| 3,916,835 A | 11/1975 | Reynolds | |
| 4,107,818 A | 8/1978 | Scott et al. | |
| 4,888,855 A | 12/1989 | Haumann et al. | |
| 5,112,270 A | 5/1992 | Howard et al. | |
| 5,152,714 A | 10/1992 | Audsley et al. | |
| 5,186,677 A | 2/1993 | Christensen et al. | |
| 5,435,776 A | 7/1995 | Owen et al. | |
| 5,487,699 A | 1/1996 | Tyrrell et al. | |
| 5,643,072 A | 7/1997 | Lankhaar et al. | |
| 5,653,629 A | 8/1997 | Audsley et al. | |
| 5,788,564 A | 8/1998 | Chamberlain | |
| 5,975,029 A * | 11/1999 | Morimoto et al. | 119/843 |
| 6,056,637 A * | 5/2000 | Freeland et al. | 452/183 |

(Continued)

FOREIGN PATENT DOCUMENTS

| | | |
|---|---|---|
| EP | 0852115 A1 | 7/1998 |
| EP | 1609365 A2 | 12/2005 |

(Continued)

*Primary Examiner* — David Parsley
(74) *Attorney, Agent, or Firm* — Robert J. Hampsch

(57) ABSTRACT

Animals such as poultry are stunned while still caged and on a vehicle or stationary platform prior to processing the animal by isolating the atmosphere surrounding the animal, adjusting the composition of the isolated atmosphere by introducing a gaseous mixture that brings the animal to the desired state, and evacuating or exhausting the gaseous mixture.

7 Claims, 4 Drawing Sheets

(56) References Cited

U.S. PATENT DOCUMENTS

| | | |
|---|---|---|
| 6,126,534 A | 10/2000 | Jacobs et al. |
| 6,135,872 A | 10/2000 | Freeland et al. |
| 6,174,228 B1 | 1/2001 | Grimsland et al. |
| 6,623,347 B1 | 9/2003 | Grimsland et al. |
| 6,694,918 B2 | 2/2004 | Draft |
| 6,848,987 B2 | 2/2005 | Draft |
| 7,097,552 B2 * | 8/2006 | Ovesen et al. ............. 452/66 |
| 2003/0168019 A1 | 9/2003 | Draft |
| 2004/0038638 A1 | 2/2004 | Ochten |
| 2004/0102147 A1 | 5/2004 | Draft |
| 2004/0194721 A1 | 10/2004 | Draft |
| 2005/0164621 A1 | 7/2005 | Christensen |
| 2005/0191953 A1 | 9/2005 | Ovesen et al. |
| 2006/0009142 A1 * | 1/2006 | Cattaruzzi ............. 452/66 |

FOREIGN PATENT DOCUMENTS

| | | |
|---|---|---|
| GB | 2063183 | 6/1981 |
| JP | 62-282535 | * 12/1987 |
| JP | 62282535 | 12/1987 |
| WO | WO2007008536 A1 | 1/2007 |

* cited by examiner ic
SYSTEM AND METHOD FOR TREATING LIVE CARGO SUCH AS POULTRY WITH GAS This application is a continuation application of application Ser. No. 11/508,703 filed Aug. 23, 2006 which is a continuation-in-part application of application Ser. No. 11/230,547 filed Sep. 21, 2005 now U.S. Pat. No. 7,794,310 which is a continuation-in-part application of application Ser. No. 11/176,277 filed Jul. 8, 2005, now abandoned.

FIELD OF THE INVENTION

The present invention relates to methods and apparatus useful for treating live cargo such as poultry, by placing them in an atmosphere that when breathed renders them progressively lethargic and then unconscious or dead.

BACKGROUND OF THE INVENTION

Commercial production of poultry (by which is meant chicken and turkey) products destined for sale for consumption customarily is carried out in processing plants. Presently, in about 95% of current processing plants, poultry is brought in by truck in cages from which the poultry is unloaded live by hand or unloaded from the truck by machine and subsequently dumped for further processing. The birds are then hung upside-down on a conveyorized shackle line and their heads are dragged through a brine or water bath. They are then stunned using high voltage electricity just prior to being slaughtered.

Hanging the birds while they are still fully awake can be very troublesome, especially with heavier birds such as tom turkeys which can weigh 40 pounds or more, leading to high labor costs and worker injuries. It is not unusual for the birds to flap their wings, causing joint damage and blood clots in the birds, thus degrading the overall quality of the meat and reducing the yield.

Stunning the poultry with gas as part of the processing regimen presents the advantage that the birds are less likely to engage in extensive movement, thereby reducing the burden to the worker and reducing the risk of damage to the bird. Poultry processors have studied the relative costs of their current methods versus gas stunning and have documented that gas stunning can prevent on the order of $700,000 per shift per year in lost product revenues for a typical turkey processor. Since the majority of processors employ two shifts per day, gas stunning can save on the order of $1.4 million per year.

However, current gas stunning systems are complicated and expensive, with upfront installation costs of 2 to 3 million dollars per line. The installation costs include costs of special cages, mechanized cage handling systems, and additional plant space which usually must be added to the current buildings of the processor.

Thus, there is a need for effective gas stunning techniques, without incurring the complexity and expense of current gas stunning methods and apparatus.

BRIEF SUMMARY OF THE INVENTION

In a broad aspect, the invention may be characterized as a non-conveyorized method for controlled atmosphere stunning of poultry confined in a plurality of cages on a vehicle. The disclosed method comprises the steps: (i) placing the poultry confined in the plurality of cages on an over-the road or transport vehicle such that the cages are stationary; (ii) enclosing the stationary cages on the vehicle to isolate the atmosphere surrounding the poultry confined in the stationary cages on the vehicle; (iii) introducing a stunning gas to the isolated atmosphere surrounding the poultry confined in the stationary cages on the vehicle; (iv) recirculating the stunning gas within the isolated atmosphere to stun or kill the poultry; (v) exhausting the stunning gas within the isolated atmosphere after the poultry have been stunned or killed; and (vi) removing the stunned or killed poultry from the stationary cages.

Some of the advantages associated with the present methods of treating poultry, over the prior art poultry stunning systems is that the presently disclosed embodiments establish the isolated atmosphere around the poultry rather than conveying or moving the poultry through a stunning chamber. By bringing an isolated atmosphere to the poultry, the parameters associated with the stunning operation, namely the relative concentrations of the gases in the isolated atmosphere and the exposure time of the poultry in the isolated atmosphere can be precisely controlled. This in turn translates to an effective and efficient stunning or treating operation and one that is easily adjustable in response to facility constraints or other operational variations.

Other advantages associated with the present method relate to the precise control of isolated atmosphere and its circulation during the stunning process as well as precise control of the atmosphere evacuation or exhaust process. Unlike the prior art 'passive' systems, the present method forces the flow of the isolated atmosphere through the cages, which contain the poultry and forces the evacuation of the isolated atmosphere at the appropriate time, such that the desired effect on the poultry is attained in a very short time and in the safest possible manner. This forcible flow of the gases within isolated atmosphere in conjunction with the regulated control of the concentrations of the gases in the isolated atmosphere and the exposure times at the various concentrations provide overall efficiency to the stunning operations as well as flexibility to customize or tailor the preferred methods at different processing facilities.

BRIEF DESCRIPTION OF THE DRAWINGS

The above and other aspects, features, and advantages of the present invention will be more apparent from the following, more descriptive description thereof, presented in conjunction with the following drawings, wherein.

DETAILED DESCRIPTION OF THE INVENTION

Animals that can be treated by this invention include any that live by breathing the ambient atmosphere. Preferred examples include poultry (i.e. chickens and turkeys), ducks and other birds, as well as mammals such as cattle, calves, sheep, goats and pigs.

The animals that are to be treated by the method of the present invention are transported to a treatment location from another location, preferably from a location at which the animals have been placed into cages or otherwise confined.

Then, the cages are transported to the treatment location, such as on a truck or other vehicle. The cages or other structure that confines the animals are of any design that contains the animal and prevents it from escaping, and that permits gaseous atmosphere to pass from outside the cage into and through the cage or ranks of cages. Preferably, the tops, bottoms and sides of the cages are planar, to facilitate stacking them onto a vehicle. It is immaterial whether the animals are confined one per cage, or more than one per cage.

As used herein, a "rank" of cages means a cage or cages lying in a vertical plane that extends from one lateral side of the enclosure described herein to the other lateral side. Thus, the term "rank" of cages includes without limitation one cage, or two or more cages stacked vertically, or two or more vertical stacks of cages placed side by side (whether touching each other or not).

The confined animals arrive at the treatment location alive. They are in, and breathing, an ambient atmosphere that does not (yet) bring them to a state of lethargy, unconsciousness or death. Typically, the animals are breathing the ambient air.

Next, steps are taken so that the composition of the atmosphere that the animals are breathing changes to a composition that, when breathed, brings the animals to whichever state is desired by the operator, that is, to a state of lethargy, unconsciousness, or death. It will of course be recognized that animals may pass through one of these states to the next. The terms "stunning" and "stun" are used herein to mean bringing an animal into a desired state of lethargy, unconsciousness or death through asphyxiation.

The composition of the atmosphere being breathed by the animals is changed so that the oxygen content of that atmosphere is decreased. Changing the composition can be carried out in many different ways. A feature common to all these ways is that the composition changes, and the animals are subjected to breathing the composition, while the animals remain confined on the vehicle.

Figure 1:
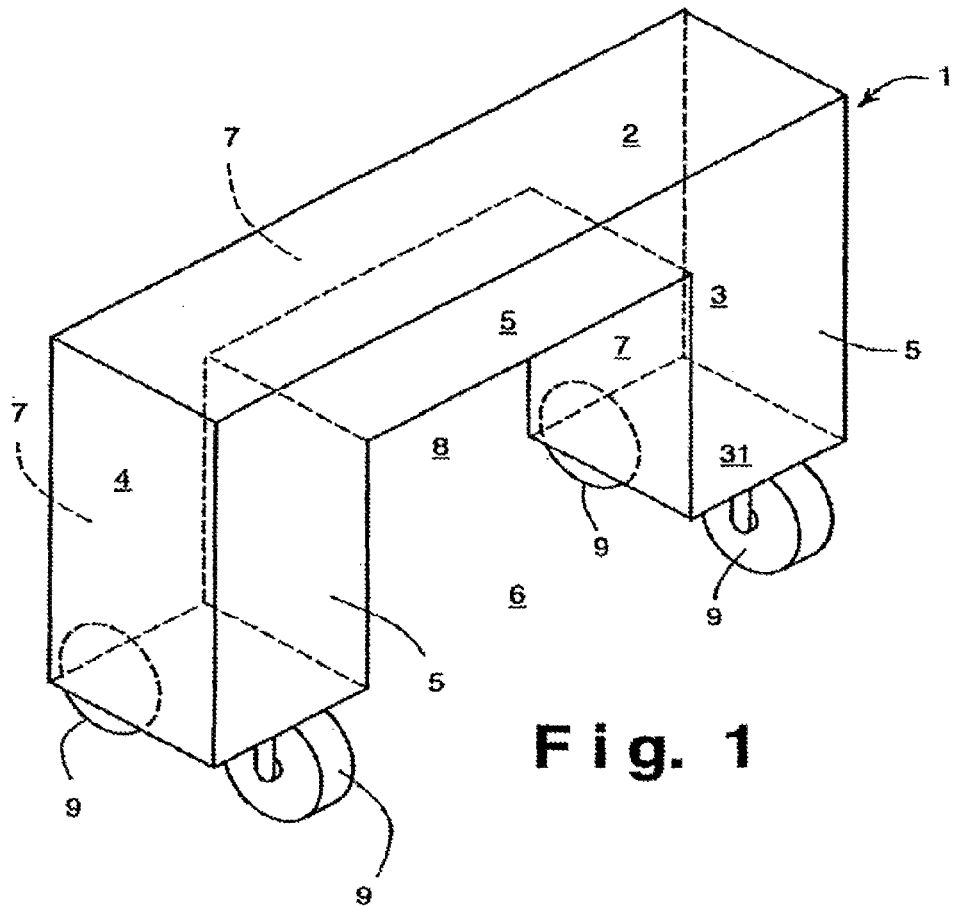
FIG. 1 is a perspective view from the outside of apparatus useful in practicing the invention.
Figure 3:
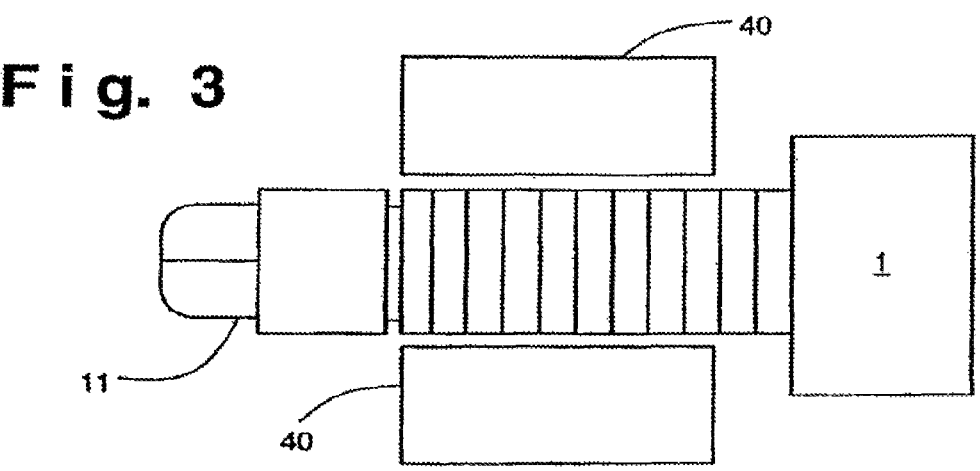
FIG. 3 is a top view of apparatus according to one embodiment of the invention.
Figure 2:
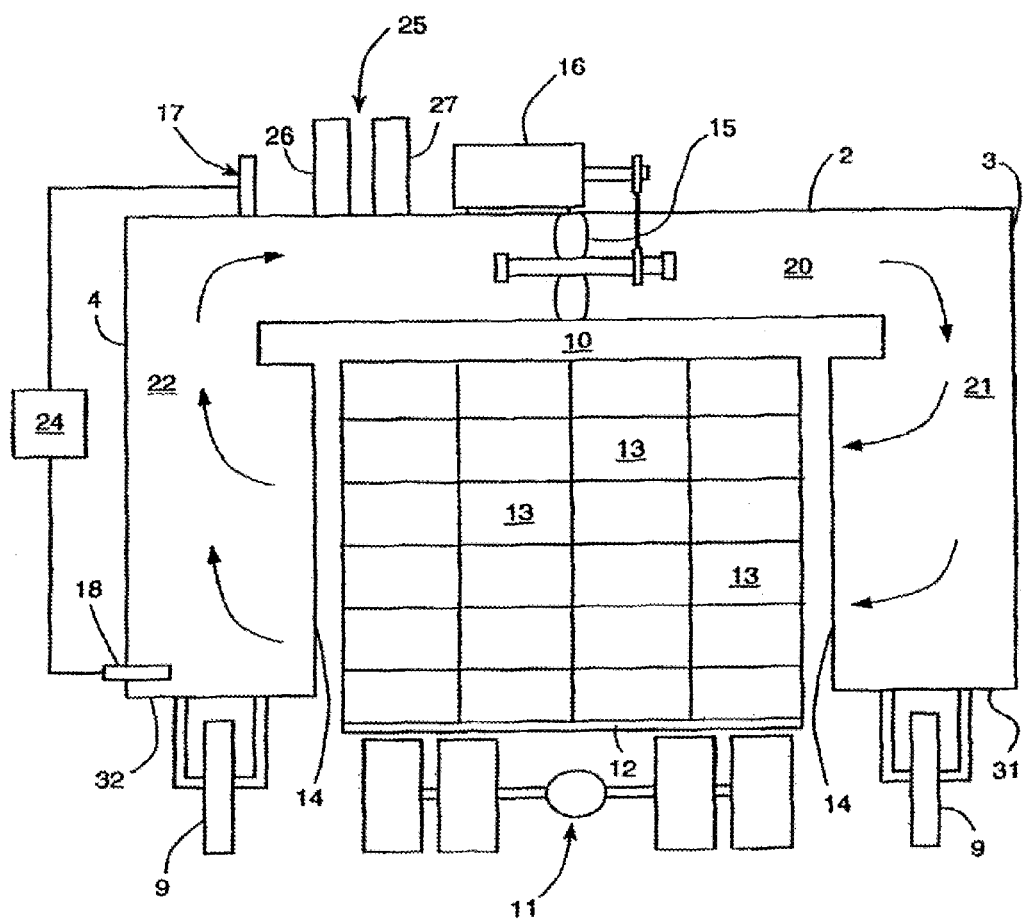
FIG. 2 is a cross-sectional view of apparatus according to the embodiment shown in FIG. 1.

One manner of changing the composition of the atmosphere and of subjecting the animals to the changing composition is to employ a structure through which the vehicle can pass. The vehicle can move through the structure while the structure (i.e. a shed or a garage) remains stationary, or the structure can be mobile (e.g. mounted on wheels) and pass along the length of the vehicle which remains stationary, or the vehicle and the structure can both move relative to the ground and relative to each other. The structure can be shorter than the vehicle, so that only a portion at a time of the vehicle is inside the structure (an example of this is illustrated in FIG. 3). Instead, the structure can be as long as or longer than the vehicle, so that the entire vehicle can fit inside the structure at one time. The composition of the atmosphere within the structure is then changed (as described below) so that animals that are in the cages within the structure are exposed to the changed atmosphere, breathe it, and are thereby brought to the desired state. After the treatment, the vehicle is moved relative to the structure so that the animals that have been breathing the changed atmosphere and have been brought to the desired state exit the structure. An example of this type of structure is illustrated in FIGS. 1-3 and is described in more detail below.

Another manner of changing the composition of the atmosphere to which the animals are subjected employs a flexible, removable wrapper such as a large sheet of plastic, tarpaulin, blanket, or the like, which is placed around all of the cages, or around selected ranks of cages, following which the composition of the atmosphere in the space within the wrapper is changed to expose the animals confined within that space to the changed atmosphere. After the treatment, when the animals have been brought to the desired state, the wrapper is removed.

Yet another manner of changing the composition of the atmosphere to which the confined animals are exposed employs a pit or equivalent depression below the grade of the ground which is at least as deep as the height of the vehicle plus the cages it is carrying, into which the vehicle is driven or rolled down a suitable ramp. The composition of the ambient atmosphere is then changed, preferably after barriers are closed above and around the vehicle and the cages to prevent excessive loss of the atmosphere while the animals on the vehicle are being exposed to the changed atmosphere. After the treatment, the animals are removed from the pit, either by removing the cages from the pit or by driving or rolling the vehicle out of the pit with the cages still on the vehicle.

In any of these embodiments, the gas treatment of the animals can be carried out while the vehicle is stationary, or while the vehicle remains in motion.

To bring about the desired change in the composition of the atmosphere to which the animals are exposed, a gaseous component or a mixture of gaseous components is fed into the atmosphere to which the animals are exposed. The component or mixture changes the composition of the atmosphere being breathed by the animals to a composition with decreased oxygen content, so that breathing it brings the animals breathing it to the desired state of lethargy, unconsciousness or death.

The gaseous component or mixture of components fed into the circulating atmosphere should not themselves be toxic to the animal but inert, bringing about the desired state by gradually asphyxiating the animal i.e. by reducing the oxygen content of the atmosphere that the animal breathes. Suitable gases include carbon dioxide, nitrogen, argon, and mixtures thereof. It should be noted that the gas or mixture of gases being added can be oxygen-free or can contain oxygen, so long as the overall oxygen content of the atmosphere being breathed decreases.

The atmosphere that renders the animal lethargic generally comprises 5% to 25% of one or more of such gases. When the gas being added comprises nitrogen, the concentration thereof should be increased above the level already present in the ambient atmosphere. The one or more gases should be added in sufficient amount, over sufficient time, to bring the oxygen concentration in the atmosphere being breathed by the animal to below 10% by weight, preferably below 5% by weight, and more preferably to below 2% by weight, or even below 1% by weight. Adding carbon dioxide until the concentration thereof reaches about 20 weight %, for example, establishes an atmosphere that when breathed by poultry renders the poultry lethargic. The atmosphere that is thereby established is typically maintained for 30 to 60 seconds, during which the animal becomes at least lethargic.

Continuing to add such a component or components to increase its concentration in the circulating atmosphere, and thereby reducing the oxygen concentration of the atmosphere, converts the atmosphere to a composition that when breathed by the animal for a sufficient time renders the animal unconscious or dead. For reasons of economy and efficiency, the same component or components injected to render the animal lethargic should be added to render the animal unconscious or dead. Generally, the concentration of the component or components should be increased to about 45% to 55% by weight, e.g. of carbon dioxide or other inert gas or combination of inert gases, and even higher when the gas being added comprises nitrogen. When the circulating atmosphere has reached this composition, circulation should be maintained for another 1 to 6 minutes, until the animals are unconscious or dead (the length of time depends on the desired final state of the animal following this treatment, the animal, and its size).

The addition of the component that is to have the desired effect on the animal can be governed automatically by an automated controller into which has been inputted the desired concentration of the component(s), and optionally also the desired rate of increase of the concentration of the component(s), that responds to measurements of the concentration that are provided by a suitable probe by adding the component(s) to bring about the desired concentration. It can be advantageous to govern the addition of the component(s) in response also to a desired rate of increase of the concentration, as animals may exhibit convulsive behavior or other excessive movement if the concentration of the stunning component(s) increases too quickly.

The addition of gas can occur without interruption throughout a treatment cycle, or can occur intermittently. When the composition of the atmosphere has reached the desired level, addition can be discontinued but one may wish to continue addition at a reduced flow rate to account for losses of the component(s) being added to the surrounding atmosphere.

The length of time that is necessary for a given atmosphere to render the animal lethargic, and the length of time necessary to reach unconsciousness or death, will depend on the component or components being used, on the component concentration, and on the type of animal and its size, and can be determined experimentally. In the preferred embodiments, poultry are exposed to multiple levels or stages of carbon dioxide concentration including: (1) a first stage where carbon dioxide level is increased to about 30 percent volume in air for a duration of about 45 seconds to anesthetize the poultry; (2) a second stage where carbon dioxide level is increased to about 45 percent volume in air for a duration of about 45 seconds to immobilize the poultry; and (3) a third stage where carbon dioxide level is increased to between about 55 and 65 percent volume in air for a duration of about 120 seconds such that the poultry reach an unrecoverable state.

When the animal being exposed to the circulating atmosphere has reached the desired state of lethargy, unconsciousness or lifelessness, addition of gas can be discontinued. Preferably, the isolated atmosphere is exhausted and replaced with ambient air.

When treatment of the animals is completed, the animal can be removed from its cage, either while the cage is still on the vehicle, or after the cage has been removed from the vehicle to facilitate taking the stunned or asphyxiated animal out of its cage. The animal can be subjected to further processing which typically can include slaughtering and dressing the carcass in any desirable fashion.

The following is a description of one embodiment of the invention, which is illustrated in FIGS. 1-3. The embodiment is described with respect to treatment of poultry, although this embodiment can be practiced with any other animals instead.

Referring first to FIG. 1, apparatus useful in the practice of this invention includes enclosure 1 which has top 2 and sides 3 and 4. Top 2 and sides 3 and 4 are gas impermeable and may be formed of sheet metal or other gas impermeable material. Sides 3 and 4 should be attached to top 2 in any manner that does not permit gas to flow through the joints between top 2 and each of sides 3 and 4.

Enclosure 1 also includes front panel 5 in which is formed entrance 6, and rear panel 7 in which is formed exit 8. As illustrated, entrance 6 and exit 8 lie along a line such that a vehicle can pass into entrance 6, through the interior of enclosure 1, and out exit 8, all along the same straight line. Thus, a passageway is formed by the vertical and horizontal edges in panels 5 and 7 that define entrance 6 and exit 8. The enclosure should also be wide enough to enclose lateral spaces 21 and 22 that are defined by sides 3 and 4 (respectively) and top 2 and front and rear panels 5 and 7. In overall dimensions, the passageway through enclosure 1 is high enough and wide enough that a vehicle such as a flatbed truck carrying stacked poultry cages can pass through it.

Enclosure 1 is supported in any of a number of possible ways. One support comprises a set of wheels 9, as illustrated in FIGS. 1 and 2, which have the advantage that they enable enclosure 1 to be easily moved in service, and into and out of service, as desired by the operator. Other ways to support enclosure 1 so that it is movable include mounting it on a set of rails, or suspending it from a set of rails. Alternatively, enclosure 1 can be suspended from overhead structure such as a gantry.

As seen in FIG. 2, upper plate 10 is provided within enclosure 1. It is located over the passageway within enclosure 1 that is occupied by a vehicle 11 when a vehicle (or part of a vehicle) is present in enclosure 1. Upper plate 10 has a width 90% to 120% of the width of the passageway (that is, the distance across entrance 6 and exit 8) and extends in length (that is, in the direction parallel to a line from the entrance of the enclosure to the exit) that is 50% to 100% of the length of the passageway. Upper plate 10 is gas-impermeable and may be constructed of sheet metal. Upper plate 10 is located below top surface 2 of the enclosure, thereby defining space 20, which is described further below. Upper plate 10 is located above the uppermost poultry cage on a vehicle 11 when a vehicle is in the passageway of enclosure 1, and close enough to the uppermost poultry cage to provide circulation of gaseous atmosphere through the cages 13 as described below. The circulation and the resulting stunning of the poultry are more effective as upper plate 10 is closer to the uppermost poultry cage. Upper plate 10 can be fixed in position, or it can be held by structure which permits the height of upper plate 10 to be adjusted to accommodate the height of the uppermost poultry cage on any given vehicle that has entered the enclosure 1.

Impeller 15 is located within enclosure 1. As shown, impeller 15 can be situated on top of upper plate 10, but impeller can be situated in either of the lateral spaces. Impeller 15 can be a fan of conventional construction. It is powered by drive 16, which can represent a source of electrical power for an electric motor that rotates fan 15, or which can represent an electric motor that turns a shaft which is connected by a belt to the shaft of fan 15. The axis of gas flow through impeller 15 is oriented so that impeller 15 drives gaseous atmosphere through a flow circuit that runs from space 20, into lateral space 21, then through a rank of cages or through several (preferably 2 to 4) ranks of cages adjacent to one another (i.e. side-by-side when seen from one side of the vehicle), into lateral space 22, then again into space 20. The arrows in FIG. 2 illustrate such a flow circuit.

FIG. 2 illustrates enclosure 1 when such a vehicle 11 carrying cages 13 is in the aforementioned passageway. Vehicle 11 can be any carrier that conforms to the description given herein, such as a trailer on wheels or a skid on wheels or rails, but the invention will be described with reference to a flatbed trailer. Indeed, a significant advantage of the present invention is that it can be practiced with trucks carrying caged poultry arriving from the poultry farm at which the poultry was caged and then placed onto the trucks, without requiring any unloading step prior to the stunning or asphyxiation of the birds.

Vehicle 11 preferably includes a bottom plate 12 or platform which is preferably gas-impermeable. Cages 13 either directly rest on the bottom of the vehicle or are stacked onto cages that directly rest on the bottom of the vehicle. To maximize efficient processing of larger numbers of poultry, each rank of cages is arrayed across the full width of the vehicle. However, fewer cages 13 than those shown in FIG. 2 can be processed in the practice of the invention on a given vehicle-load of cages.

The cages 13 are of any design that can hold a chicken or turkey and that permits gaseous atmosphere to pass from outside the cage into and through the cage. The tops, bottoms and sides of the cages are planar, to facilitate stacking them onto a vehicle such as shown in FIG. 2.

Preferably, a barrier is provided that retards loss of the atmosphere within the enclosure to the air outside the enclosure, downwardly past the bottom edges of the sides 3, 4 and of the front and rear panels 5 and 7. Such a barrier can be provided by constructing the enclosure so that the lateral spaces 21 and 22 are bounded on the bottom by rigid or flexible structure 31 and 32 that closes off the bottom of each lateral space and terminates at or near the vertical edges of the entrance 6 and exit 8.

Enclosure 1 also includes injector 17 which injects into the atmosphere that is to circulate within the fluid flow circuit, a gaseous component that renders the atmosphere capable of rendering the poultry lethargic, and that is capable of rendering the poultry unconscious or dead (when breathed in sufficient concentration for a sufficient period of time) if that is the desired effect on the poultry. If the desired effect on the poultry is to be caused by a combination of more than one component, there can be one injector that injects a mixture of the components, or there can be a separate injector for each of the components that make up the stunning atmosphere. The injector 17 (or the several injectors, if necessary) inject into space 20 at a point upstream of impeller 15. Each injector is connected to a source of the component being injected (such as a storage tank) by a suitable feed line equipped with flow control valving.

Probe 18 is provided that measures the composition of the atmosphere within enclosure 1, or at least measures the concentration within that atmosphere of the component or components that are to have the desired effect (i.e., lethargy, unconsciousness, or death) on the poultry. Probe 18 is connected by conventional wiring to suitable electronic apparatus 24 by which an operator or, preferably, an automated controller, can respond to the measurement taken by the probe and adjust as necessary the composition of the circulating atmosphere by, for instance, turning on the flow of the component through the injector, turning off that flow through the injector, adjusting the feed rate at which the component is injected into the enclosure, and/or adjusting the concentration of the component in the stream that is injected into the enclosure. The feeding of a component or components via the injector is automatically governed in response to measurements taken by probe 18 of the concentration of the component. Controller and associated equipment that perform the desired function, i.e. determining the concentration of the component, and determining (as a function of the concentration of the component in the flow circuit and of the desired concentration in the flow circuit) whether to adjust the flow of the component through the injector, when to turn on and shut off that flow, and the like, is familiar to people knowledgeable in the field of controlling gas atmospheres.

Enclosure 1 also includes apparatus with which the atmosphere within the flow circuit can be exhausted from the enclosure after poultry has reached the desired state of being rendered lethargic, unconscious or dead, and with which fresh air can be fed into the enclosure. Suitable apparatus includes an exhaust vent 26, which can be opened or closed as desired by the operator, extending from the interior of the enclosure to the air outside the enclosure, through which atmosphere within the enclosure can be vented, and feed vent 27 through which ambient air can be drawn into the enclosure. The functions of vents 26 and 27 can if desired be carried out by two separate vents or by one vent that performs both functions.

An optional additional feature present in enclosure is distributor 14, which is a device through which circulating atmosphere passes and which provides that the mass flow rates at which the atmosphere passes to the highest-elevated cage 13 (i.e. closest to upper plate 7) and to the lowest cage (i.e. closest to bottom plate 12) do not differ by more than 20% and preferably by not more than 10%. That is, distributor 14 promotes uniform flow rates of the gaseous atmosphere that passes through to the caged poultry, unaffected by the height of a poultry cage above the bottom plate 12. A distributor 14, if present, is situated in or at the downstream face of lateral space 21, upstream of the rank or ranks of cages to which circulating stunning atmosphere is to be directed. Distributor 14 is a thin sheet of metal or plastic with a large number of perforations through it. The sizes of the perforations can be different at different locations in the distributor, so that when gaseous atmosphere in lateral space 21 is placed under pressure (such as by the action of impeller 15) the atmosphere flow rate to all cages in the rank or ranks is relatively uniform. The top edge of a distributor such as distributor 14 extends from a side edge of upper plate 10, and it should extend downward to the level of the lowest cage to which stunning atmosphere is to be directed. Distributor 14 is of a height and width sufficient to fill the space through which circulating gas passes in the flow circuit. A distributor having the same characteristics and functionality can be situated in or at the upstream face of lateral space 22, downstream of the rank or ranks of cages through which circulating atmosphere has flowed.

In one mode of operation, a vehicle 11 such as a truck carrying or pulling a flat bed stacked with cages of poultry is positioned in the enclosure as shown in FIG. 3. One rank of cages and preferably 2 to 4 ranks of cages are within enclosure 1. Preferably, when a vehicle's load of cages is first being subjected to treatment by this invention, the first cages that are within the enclosure are the cages closest to the front of the vehicle. If the position of upper plate 10 is adjustable, then when carrier 11 has entered enclosure 1 upper plate 10 (or a portion thereof, is moved downward as close as possible to the top of a poultry cage while still enabling the carrier to move without having the upper plate dislodge any poultry cages.

In an optional embodiment, a vertical gas-impermeable sheet is placed across the width of the vehicle, one on each side of the rank or ranks of cages that are about to be exposed to the stunning atmosphere. Each sheet should be as high as the stack of cages in the rank or ranks, and each sheet should be as wide as the rank or ranks are deep (that is, as seen across the width of vehicle 11). The sheets improve efficiency by reducing the amount of circulating stunning gas atmosphere that is lost from the front and rear walls of the cages and that thus avoids being circulated in the desired flow path described herein. Alternatively, the cargo area of the vehicle can be constructed with a plurality of gas impermeable panels extending vertically from the platform that is adapted to contain ranks of open-air cages for the poultry across the entire width of the platform. The gas impermeable panels operate to partition the cargo area into a plurality of cargo sections and limiting air flow between adjacent cargo sections. Such customized vehicle is specifically designed to sealably engage with the Enclosure 1 shown and described herein.

The efficiency and effectiveness of the circulating atmosphere in bringing the poultry to the desired state of lethargy, unconsciousness or death are increased by decreasing the size of the gap between the face(s) of cages exposed to lateral spaces 21 and 22, and the edges closest to the vehicle of the surfaces that define lateral spaces 21 and 22 (i.e., in the case of lateral space 21, the edges of front panel 5, rear panel 7, and bottom structure 31). Satisfactory operation can be achieved even with a gap of up to a few inches.

However, as another optional feature, a movable flexible skirt can be provided that helps to channel the atmosphere that is circulating within the aforementioned flow circuit from the lateral space 21 to the cages into which the atmosphere is to be directed, and out of such cages into lateral space 22. The upstream edges of the upstream skirt and the downstream edges of downstream skirt are secured to the adjacent side edges of upper plate 10, and to the interior surfaces of front panel 5 and of rear panel 7, and to either the interior surfaces of sides 3 and 4 or to the interior surface of bottom structure 31 and 32. The downstream edge of the upstream skirt and the upstream edge of the downstream skirt should have a sufficient circumferential length that they each define an opening (through which the circulating atmosphere flows) as tall and as wide as the height and width of the rank or ranks of cages through which the atmosphere is to be circulated. These edges can if desired be joined to a gasket or other collar-like structure having the length and width of the rank or ranks of cages to be treated; using such a gasket or similar device facilitates handling the skirt material. Each skirt should be of a length adequate to extend from the areas at which it is attached to the structure of the enclosure, to the rank or ranks of cages through which the circulating atmosphere is to be directed. Suitable materials of construction for the skirt include heavy cloth, plastic (such as flexible polyethylene or polypropylene sheeting) or sections of stiffer plastic material hinged together.

With the vehicle in position so that a rank or several ranks of cages are within the enclosure, and with the aforementioned apparatus 25 for exhausting atmosphere from the enclosure and for feeding ambient air into the enclosure closed, skirts (if present) are optionally positioned to help channel atmosphere flow through the selected rank or ranks of cages, and one or more components are injected via the aforementioned one or more injectors 17 to impart to the atmosphere a composition which, when breathed by the poultry in the selected rank or ranks of cages, will begin to bring the poultry to the desired state i.e. lethargic, unconscious or dead. The impeller should at this time be operating, to circulate the component or components that are injected into the circulating atmosphere.

As mentioned above, the injection of the component that is to have the desired effect on the poultry can be governed automatically by an automated controller into which has been inputted the desired concentration of the component(s), and optionally also the desired rate of increase of the concentration of the component(s), that responds to measurements of the concentration that are provided by probe 18 by injecting the component(s) to bring about the desired concentration. It can be advantageous to govern the injection of the component(s) in response also to a desired rate of increase of the concentration, as birds may exhibit convulsive behavior such as wing flapping and other excessive movement if the concentration of the stunning component increases too quickly.

Thus, the injection can occur without interruption throughout a treatment cycle, or can occur intermittently. When the composition of the atmosphere has reached the desired level, injection can be discontinued but one may wish to continue injection at a reduced flow rate to account for losses of the atmosphere out of the flow circuit.

When the poultry being exposed to the circulating atmosphere has reached the desired state of lethargy, unconsciousness or lifelessness, injection of gas is discontinued. The atmosphere is exhausted from the flow circuit, for instance through exhaust vent 26, and ambient air is drawn into the flow circuit, for instance through feed vent 27. Continuing to operate the impeller during this stage helps to exhaust the stunning atmosphere from the enclosure and to draw in ambient air. The aforementioned optional skirts, if present, can be retracted from the sides of the vehicle 11 at this time.

The vehicle and the enclosure are moved relative to each other so that another rank or adjacent ranks of cages are in position to be treated in the same sequence of steps just described. The aforementioned exhausting of stunning atmosphere and reintroduction of ambient air can be carried out while this movement is occurring, although it is preferred that poultry next to be treated is not exposed at the outset to a high concentration of a stunning atmosphere. Preferably, ranks of cages should be treated in a sequence from the cages closest to the front of the vehicle, along the length of the vehicle in order, concluding with the cages closest to the rear of the vehicle, to minimize excessive movement of the vehicle and the enclosure, and to enable poultry in the front most cages to be removed from the vehicle even while cages remaining on the vehicle are being treated or are still awaiting treatment.

Movement of the vehicle with respect to the enclosure can be carried out in any of several different ways. The vehicle can be driven, that is, moved or pulled under the power of the vehicle itself just as though the vehicle were traveling under its own power on the open road. Alternatively, the vehicle (the entire truck, if it is a unitary vehicle or a cab unit pulling a trailer with the caged poultry, or only the trailer carrying the caged poultry) can be drawn into and through the enclosure by apparatus such as a cable attached to the front of the vehicle by which the vehicle is pulled through the enclosure, or by apparatus that engages the underside of the vehicle with a drive mechanism that draws the vehicle through the enclosure (such as the sort of mechanism employed in automatic car washes).

In other alternatives of repositioning the enclosure to circulate the stunning atmosphere through successive ranks of cages, the enclosure can be moved relative to the ground and relative to the vehicle, while the vehicle is stationary or while the vehicle is moving relative to the ground. This alternative is facilitated by mounting the enclosure on wheels or on rails so that the enclosure can move relative to the ground. In the alternatives in which the enclosure moves, the enclosure can be moved n a direction from the front of the vehicle to the rear of the vehicle, or in the opposite direction, or back and forth alternating between those two directions.

The length of time that is necessary for a given atmosphere to render the poultry lethargic, and the length of time necessary to reach unconsciousness or death, will depend on the component or components being used, and on the component concentration, and can be determined experimentally.

Referring again to FIG. 3, when the vehicle begins to emerge from the exit of the enclosure so that caged poultry which has been rendered lethargic, unconscious or dead is accessible from outside the enclosure, the poultry in the cage or cages that have become accessible are removed from the vehicle at unloading area 40 for further processing of the poultry. The poultry is removed from its cages, either while the cages are still on the vehicle, or after each cage has been removed from the vehicle to facilitate taking the stunned bird out of its cage. Further processing typically will include slaughtering the poultry, and dressing the carcass in any desirable fashion. Caged poultry that has been rendered lethargic, unconscious or dead by the treatment described herein are removed from the front part of the vehicle while other poultry caged in the more rearward areas of the vehicle are still undergoing stunning within the enclosure or are awaiting treatment.

Figure 4:
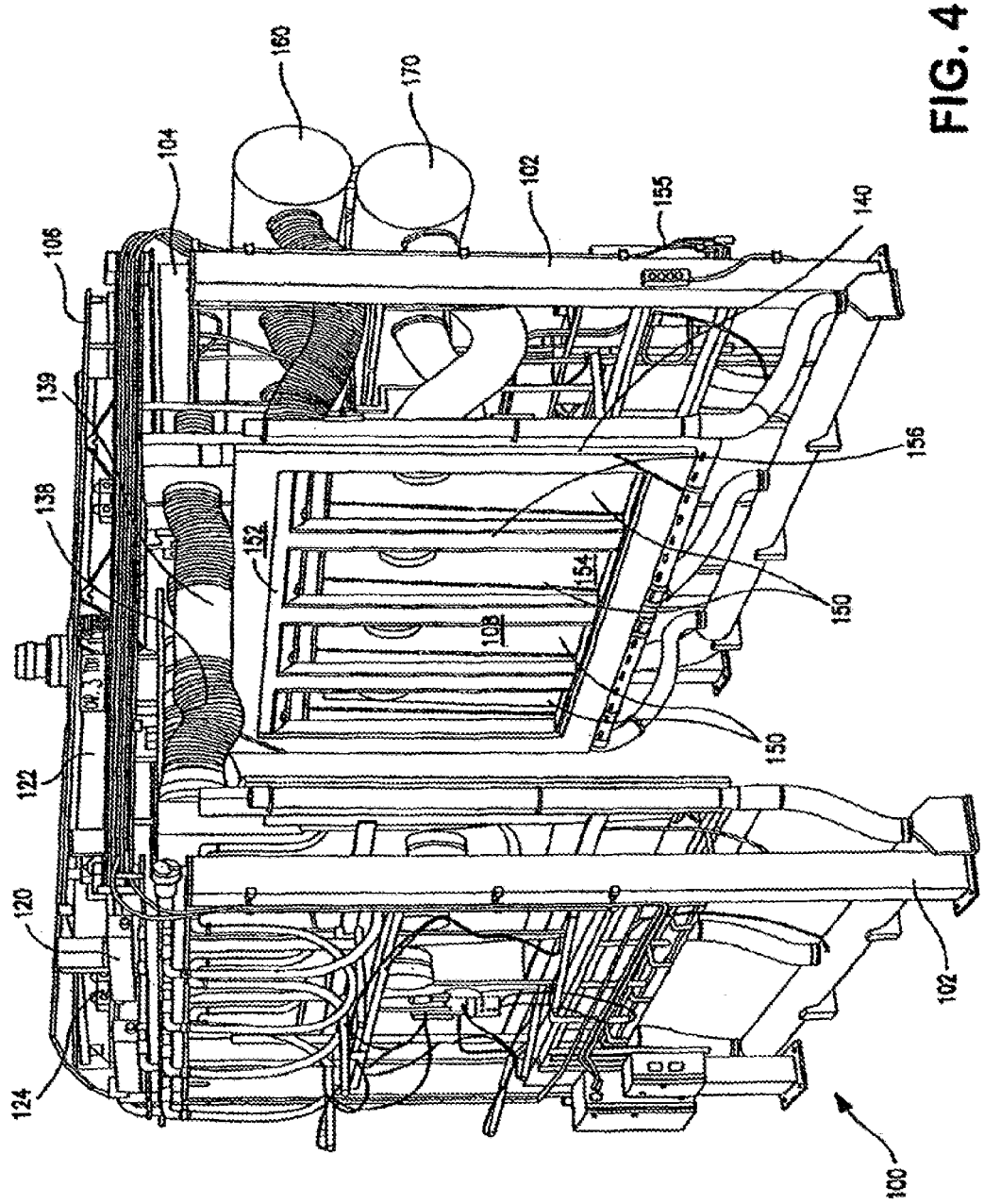
FIG. 4 is a perspective view of an alternate embodiment of the apparatus useful in practicing the invention.
Figure 5:
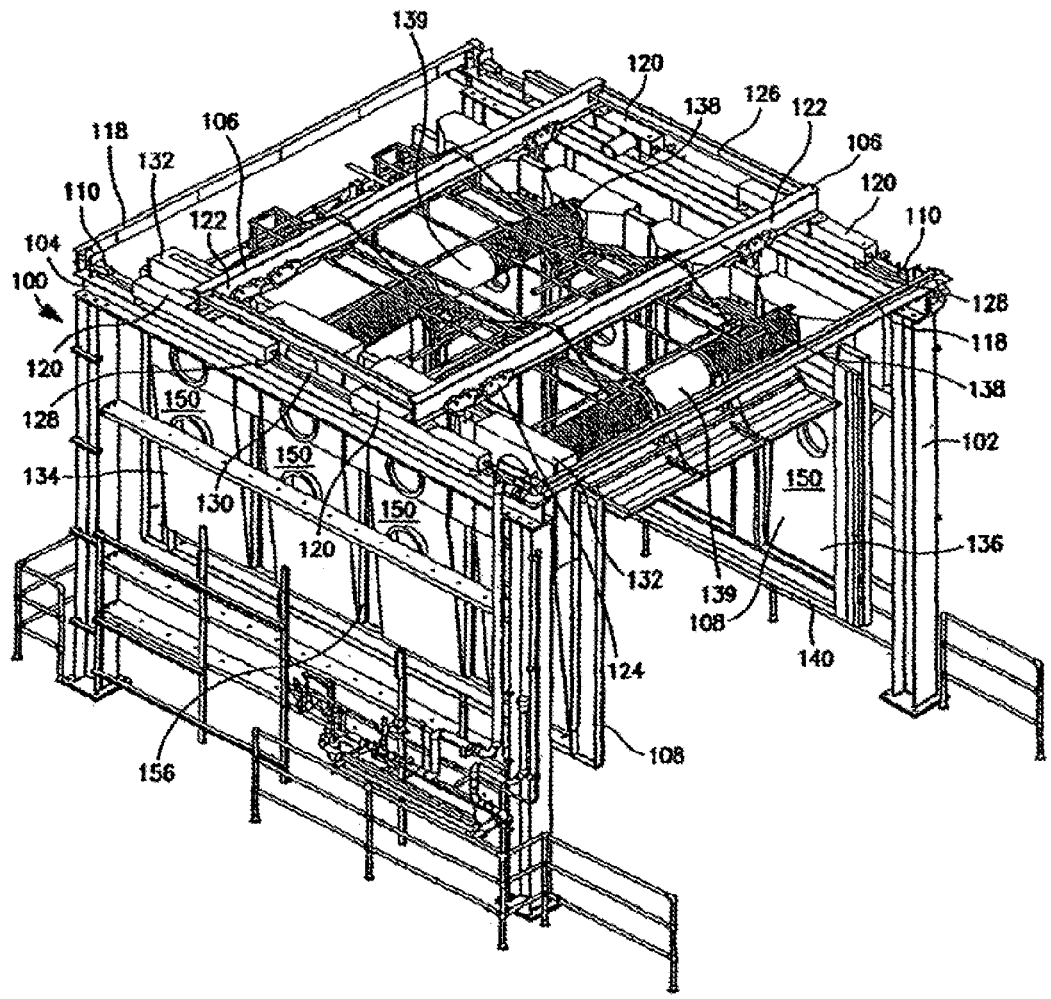
FIG. 5 is another perspective view of the alternate embodiment similar to the apparatus of FIG. 4.

FIGS. 4 and 5 illustrate an alternate and preferred apparatus useful in performing the above-described stunning operations. While the apparatus in this preferred embodiment differs from the above-described embodiment, the specific process steps and operational controls are generally similar to those described above with reference to FIGS. 1-3 and will therefore not be repeated here.

As seen in FIGS. 4 and 5, the support structure 100 or gantry, is the standing frame that supports the weight of all the other major equipment. It includes the stationary columns 102 and girders 104 as well as a moveable bridge 106 that carries the stunning ducts 108. In the illustrated embodiment, the support structure 100 is designed to be mounted only to the floor. However, a moveable support structure is also specifically contemplated. The upper portion of the support structure 100 may also be attached to a wall or ceiling to stiffen the structure and reduce movement or swaying caused by movement of the bridge 106 or when the bridge reaches the mechanical stops 110.

The support structure 100 includes a plurality of stationary columns 102 and a plurality of girders 104 which are bolted or otherwise fixedly attached to the columns 102. The girders 104 also act as the rails on which the bridge 106 rides. Mechanical stops 110 located near both ends 114, 116 of the girders 104 limit the travel of the bridge 106. Additional support for the columns 102 is provided by ties 118 between the ends of the girders 104.

The bridge 106 or carriage, aligns the stunning ducts 108 to the trailer or other platform on which the poultry are situated. The major components of the bridge 106 are the trucks 120, girders 122, and trolleys 124. The bridge girders 122 span the space between the support structure 100 on both sides of the trailer. The bridge girders 122 are connected with bridge ties 126 that provide stability and form the girders 122 and trucks 120 into a single unit. The illustrated bridge 106 also includes system two motorized trucks and two non-motorized trucks. The motorized trucks are preferably bolted to one of the bridge girders 122 while the non-motorized trucks are bolted to the second bridge girder 122. The trucks 120 are controllably operated to move the bridge 106 in an axial direction along the length of the trailer. Each truck 120 includes a set of guide wheels 128 that allows the truck to be guided by the rod 130 on the girders 104 associated with the support structure 100.

Push-type trolleys 124 are moveably disposed along the bottom flange of the bridge girders 122 and are also fixedly attached to the stunning ducts 108. Thus, as the trolleys 124 move along the bridge girder 122 that spans the width of the trailer, the stunning ducts 108 can engage or disengage from the trailer.

The stunning duct 108 acts as a shroud for the trailer and together with the trailer platform completes the enclosure defining the isolated atmosphere. Fans 132 operatively associated with the stunning ducts 108 circulate the carbon dioxide or other stunning gas through the cages on the trailer and bring in fresh air to purge the carbon dioxide out of the enclosure. In the illustrated embodiment of FIGS. 4 and 5, the stunning gas flows from the fan side duct 134, through the trailer, to the non-fan side duct 136. The stunning gas circulates back to the fan side duct 134 through return hoses 138 disposed above the trailer at the top of the duct. Each hose feeds a centrifugal fan 132 located in the fan side duct 134. To allow movement of the stunning ducts 108 to engage and disengage from the trailer, a portion of the return hoses 138 are preferably constructed of a flexible material. To reduce the sag in the return hose 138 and the amount of hose to replace during maintenance, the center portion 139 of the return hose 138 is preferably constructed of a rigid PVC duct.

Carbon dioxide or other stunning gas is controllably injected into the stunning duct by means of a pipe extending from a source of stunning gas into the return hose 138 associated with each stunning duct 108.

Rubber seals 140 along the faces of the stunning ducts 108 that come into contact with the trailer greatly reduce the amount of carbon dioxide that leaks into the treatment area. The seals 140 are preferably attached with an adhesive.

The stunning ducts 108 are preferably constructed in a modular fashion wherein each duct section 150 is generally sized to correspond to the width of a single cage on the trailer. Each duct section 150 is preferably tapered from the top 152 to the bottom 154 to facilitate flow distribution and to reduce the total volume of the isolated atmosphere within the enclosure. Reducing the volume of the enclosure in turn reduces the amount of carbon dioxide required to operate the system. The duct sections are then fastened together along with channels 156 to form the complete duct.

The fan side duct 134 includes one or more duct sections 150 as described above, one or more stunning fans 132, a duct damper and exhaust/air dampers. The operation of these components: (i) forcibly circulates the stunning gas through the enclosure; (ii) diverts or exhausts the flow of the stunning gas as required; and (iii) introduces fresh ambient air into the enclosure as required. The stunning fans 132 are direct-drive centrifugal plug fans that are disposed in each duct section driven with a 10-hp motor. The suction side of the stunning fan 132 is fed by a hose from the non-fan side duct 136. The non-fan side duct 136 operates as the return plenum for the forced air circulation.

Within each section 150 of the stunning duct 108 there is a plurality of dampers (not shown) including a duct damper, an exhaust damper, an air damper and a vent damper. In the closed position, this duct damper blocks the flow from the stunning fan from entering the isolated atmosphere in the enclosure. When used with the opening of the exhaust and air dampers, the stunning gas in the trailer is exhausted, and fresh air is brought into the trailer. The duct damper is closed only when the stunning system is operating in an air purge mode. At all other times, the duct damper should be open to allow forced circulation of the isolated atmosphere within the enclosure. The duct damper uses a pneumatic rotary actuator to open and close in response to commands or inputs from the control system 155. The exhaust damper exhausts the carbon dioxide from the duct section 150 during an air purge operation. The exhaust damper is connected to an exhaust manifold 160. Concurrently, the air damper allows fresh ambient air into the duct section during an air purge operation. The air damper is also connected to a fresh air manifold 170. Like the duct damper, the exhaust dampers and air dampers are controlled by pneumatic actuators in response to commands or signals from the control system 155. The vent dampers associated with the stunning duct 108 will vent the excess or displaced air to keep the stunning system operating at or near atmospheric pressure. The vent damper is preferably a weighted damper that opens with an increase of pressure inside the stunning duct. Although each duct section 150 has a port available, not all ports are required to open in order to vent the displaced gas.

Also illustrated in FIG. 4 is an exhaust blower, exhaust ducting and floor pickups that establish a floor exhaust system adapted to exhaust any carbon dioxide vapor that leaks out of or remains in the truck after the stunning operation. The exhaust system safely discharges the residual carbon dioxide vapors outside the immediate work area.

Yet another alternate embodiment of the present system and method of treating poultry involves initially off-loading the poultry in their cages from the vehicle to a designated platform, preferably stationary platform, where the apparatus similar to that shown and described with reference to FIGS. 4 and 5 is employed to shroud the cages or ranks of cages on the platform. After securing the above described enclosure to the platform, which generally isolates the atmosphere proximate the poultry, an oxygen-depleted gaseous mixture is preferably introduced to the shrouded platform to alter the composition of the isolated atmosphere and asphyxiate the poultry or otherwise impart the desired effect on the poultry. The specific apparatus, process steps, and operational controls are generally similar to those described above with reference to FIGS. 1-5 and will not be repeated here.

The method and apparatus of the present invention provide several advantages. The invention provides the advantages that other techniques for stunning or asphyxiating the poultry provide, such as reducing the difficulty and hazards faced by workers who have to handle live, fully awake birds. But the invention provides these at considerably less cost both in the cost of setting the necessary apparatus and the cost of operating it. Also, the apparatus can operate in a much smaller space than is required by other stunning operations. In addition, the overall time required to treat (stun) the cargo (e.g. a given quantity of poultry) is reduced, compared to other stunning techniques, because of the rapidity with which the invention works and because while some of the poultry is still being stunned it is possible to be already delivering stunned birds for further processing.

What is claimed is:

1. A method for controlled atmosphere stunning of poultry confined in a plurality of cages on a transport vehicle comprising the steps of:
   (i) placing the poultry confined in the plurality of cages on the transport vehicle such that the cages are stationary;
   (ii) enclosing the stationary cages on the transport vehicle to isolate the atmosphere surrounding the poultry confined in the stationary cages on the transport vehicle by disposing a moveable enclosure, through which the transport vehicle can pass, around the stationary cages on the transport vehicle to sealably isolate the atmosphere surrounding the poultry;
   (iii) introducing a stunning gas to the isolated atmosphere surrounding the poultry confined in the stationary cages on the transport vehicle; and
   (iv) recirculating the stunning gas within the isolated atmosphere surrounding the poultry confined in the stationary cages on the transport vehicle to stun or kill the poultry;
   (v) exhausting the stunning gas within the isolated atmosphere surrounding the poultry confined in the stationary cages on the transport vehicle after the poultry have been stunned or killed; and
   (vi) removing the stunned or killed poultry from the stationary cages on the transport vehicle.

2. The method according to claim 1 wherein the transport vehicle is a flatbed truck or trailer truck.

3. The method according to claim 1 wherein the steps of (ii) enclosing stationary cages on the vehicle, (iii) introducing stunning gas to the isolated atmosphere; and (iv) recirculating the stunning gas within the isolated atmosphere to stun or kill the poultry are applied to a first portion of the stationary cages on the transport vehicle and then subsequently applied to a second portion of the stationary cages on the transport vehicle.

4. The method according to claim 1 wherein the controlled atmosphere stunning method is a multi-stage stunning process and the step of recirculating the stunning gas within the isolated atmosphere provides a uniform flow and concentration of stunning gas through all stationary cages on the transport vehicle during any of the stages.

5. The method according to claim 1 wherein the controlled atmosphere stunning method is a multi-stage stunning process and the stunning gas is carbon dioxide gas.

6. The method of claim 5 wherein the step of introducing carbon dioxide gas into the isolated atmosphere further comprises:
   rapidly introducing carbon dioxide gas to the isolated atmosphere to attain a first concentration of at least 30% carbon dioxide within 60 seconds or less sufficient to bring the poultry to a state of lethargy;
   further introducing additional carbon dioxide gas to the isolated atmosphere to attain a second concentration of at least 45% carbon dioxide in the isolated atmosphere for a duration sufficient to bring the poultry to a state of unconsciousness; and
   still further introducing additional carbon dioxide gas to the isolated atmosphere to attain a third concentration of greater than 55% carbon dioxide in the isolated atmosphere for a duration of about 120 seconds.

7. The method of claim 1 wherein the controlled atmosphere stunning method is a multi-stage stunning process and the step of introducing stunning gas to alter the composition of the isolated atmosphere further comprises:
   rapidly introducing the stunning gas to the isolated atmosphere to attain a first concentration of stunning gas within 60 seconds or less sufficient to bring the poultry to a state of lethargy;
   further introducing additional stunning gas to the isolated atmosphere to attain a second concentration sufficient to bring the poultry to a state of unconsciousness; and
   still further introducing additional stunning gas to the isolated atmosphere to attain a third concentration of less than 10% oxygen in the isolated atmosphere for a duration of 120 seconds or more sufficient to kill the poultry.

\* \* \* \* \*